Nov. 12, 1940.  L. E. SODERQUIST  2,221,210
FILTER FOR DRY CLEANER SOLVENTS
Filed Oct. 1, 1937  6 Sheets-Sheet 1
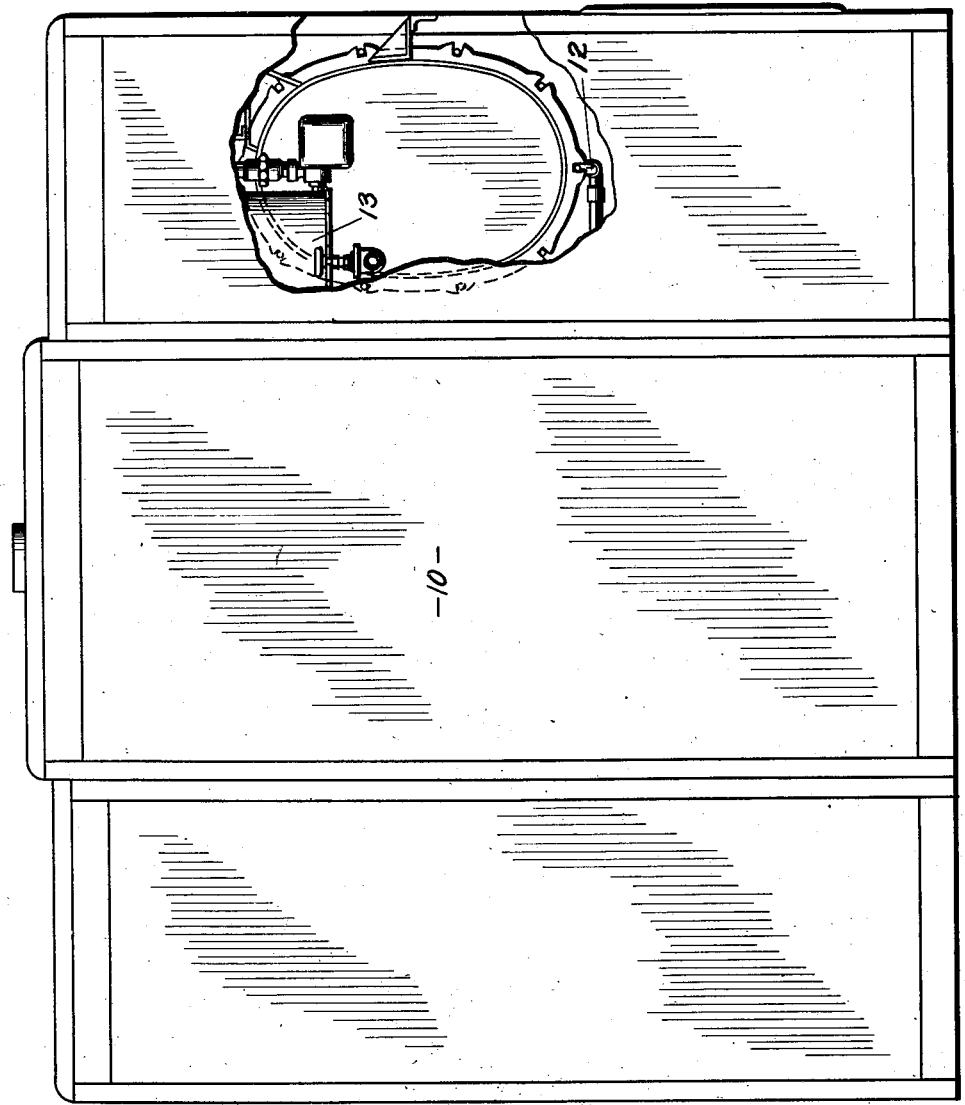
INVENTOR.
Leslie E. Soderquist
BY Tefft & Tefft
ATTORNEYS Nov. 12, 1940.    L. E. SODERQUIST    2,221,210
FILTER FOR DRY CLEANER SOLVENTS
Filed Oct. 1, 1937    6 Sheets-Sheet 2
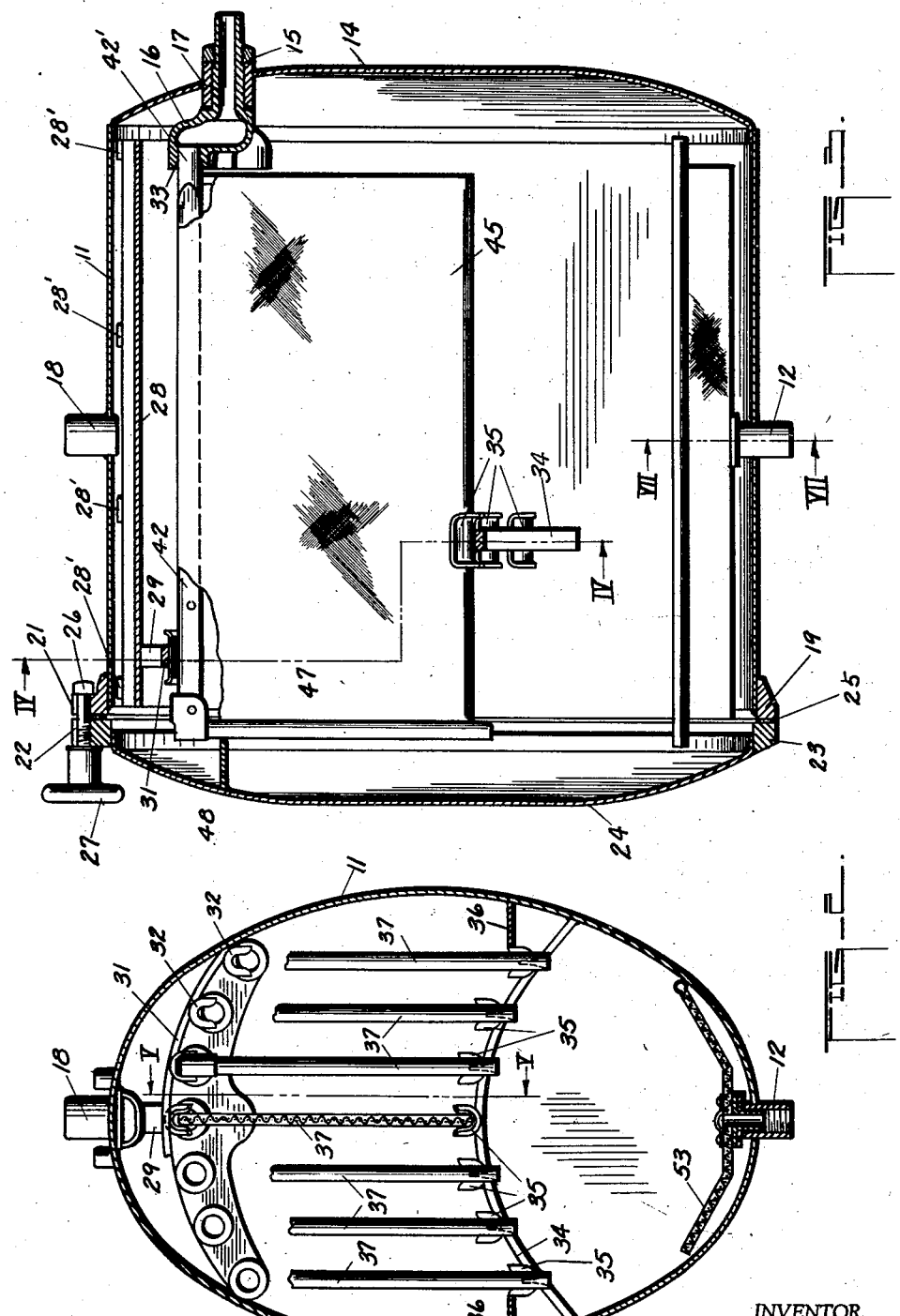
INVENTOR.
Leslie E. Soderquist
BY Tefft & Tefft
ATTORNEYS

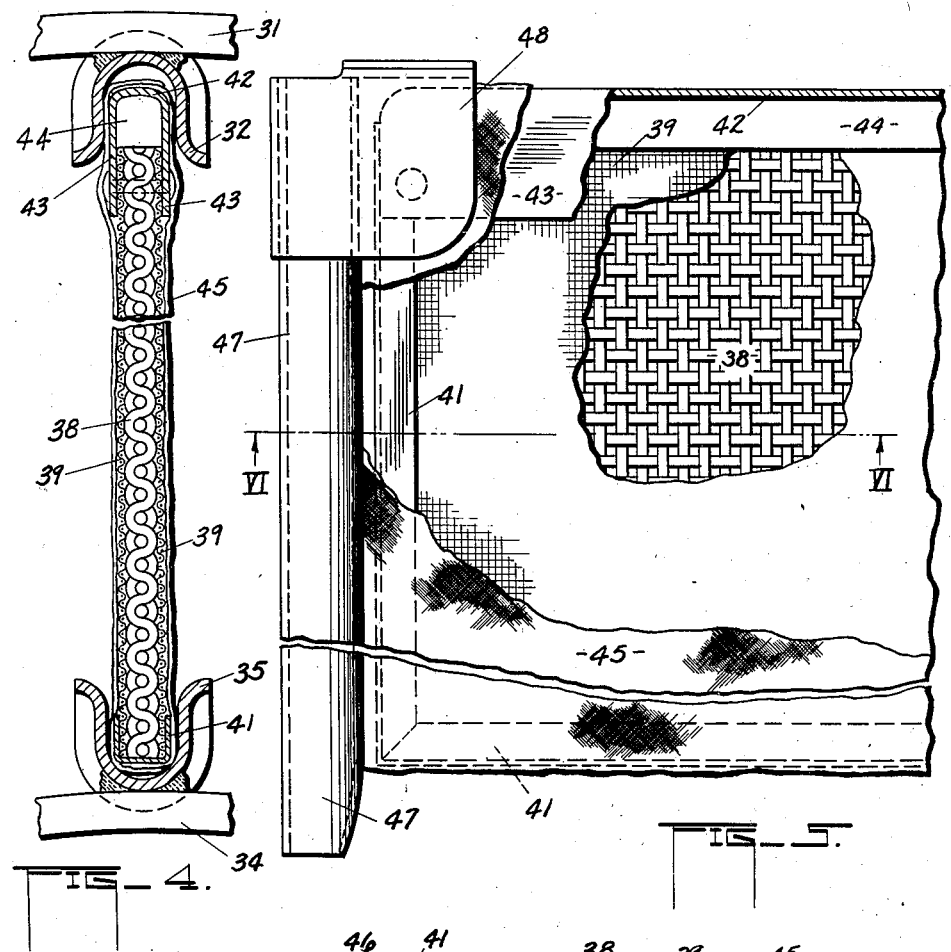
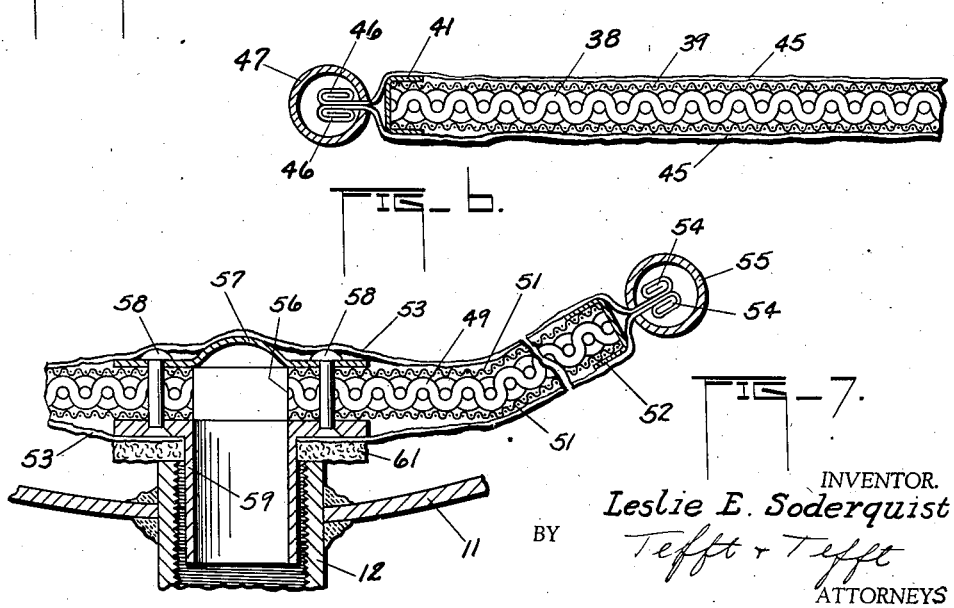

Nov. 12, 1940.                    L. E. SODERQUIST                    2,221,210
                            FILTER FOR DRY CLEANER SOLVENTS
                        Filed Oct. 1, 1937        6 Sheets-Sheet 4
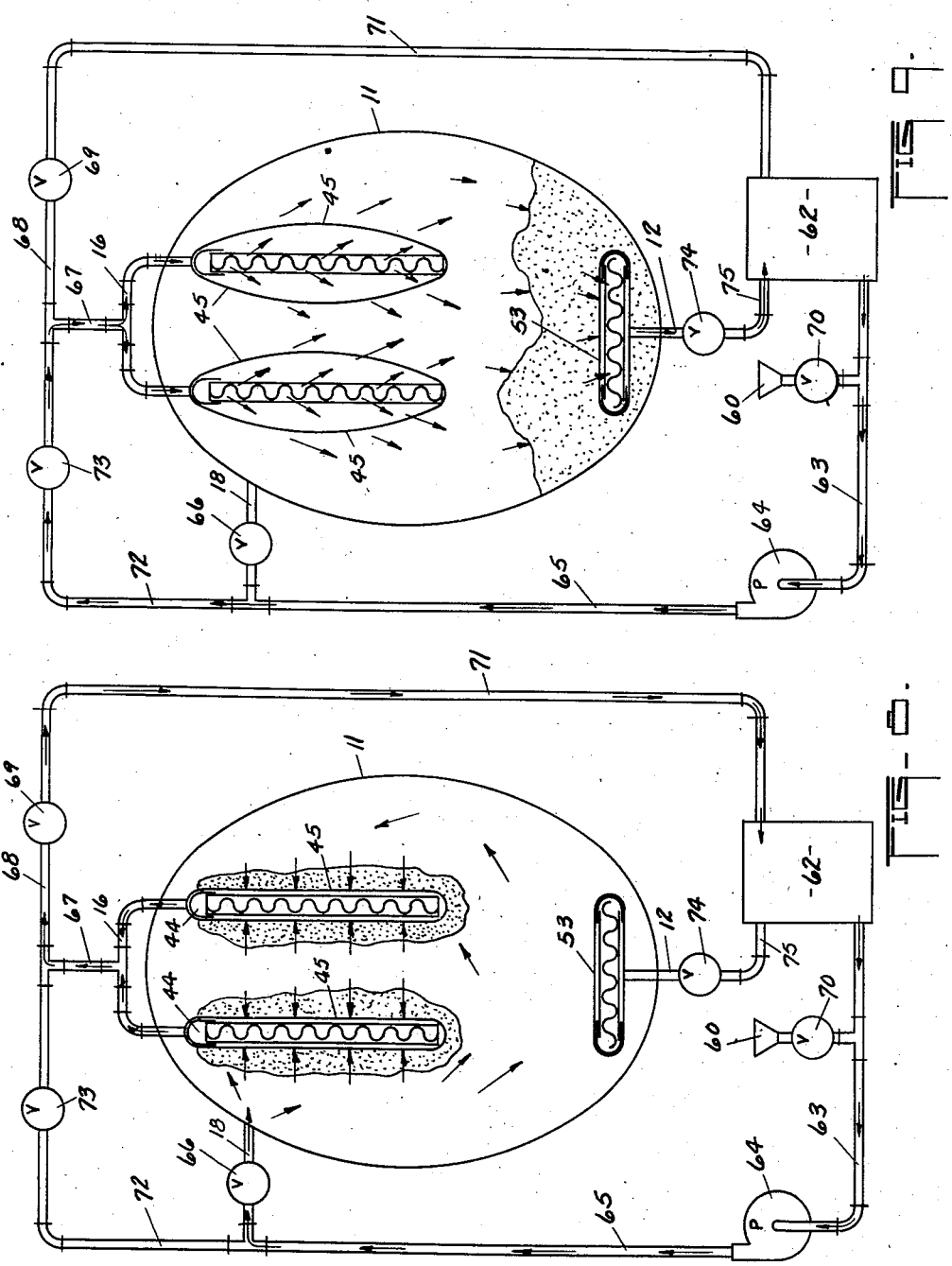
INVENTOR.
Leslie E. Soderquist
BY Tefft & Tefft
ATTORNEYS

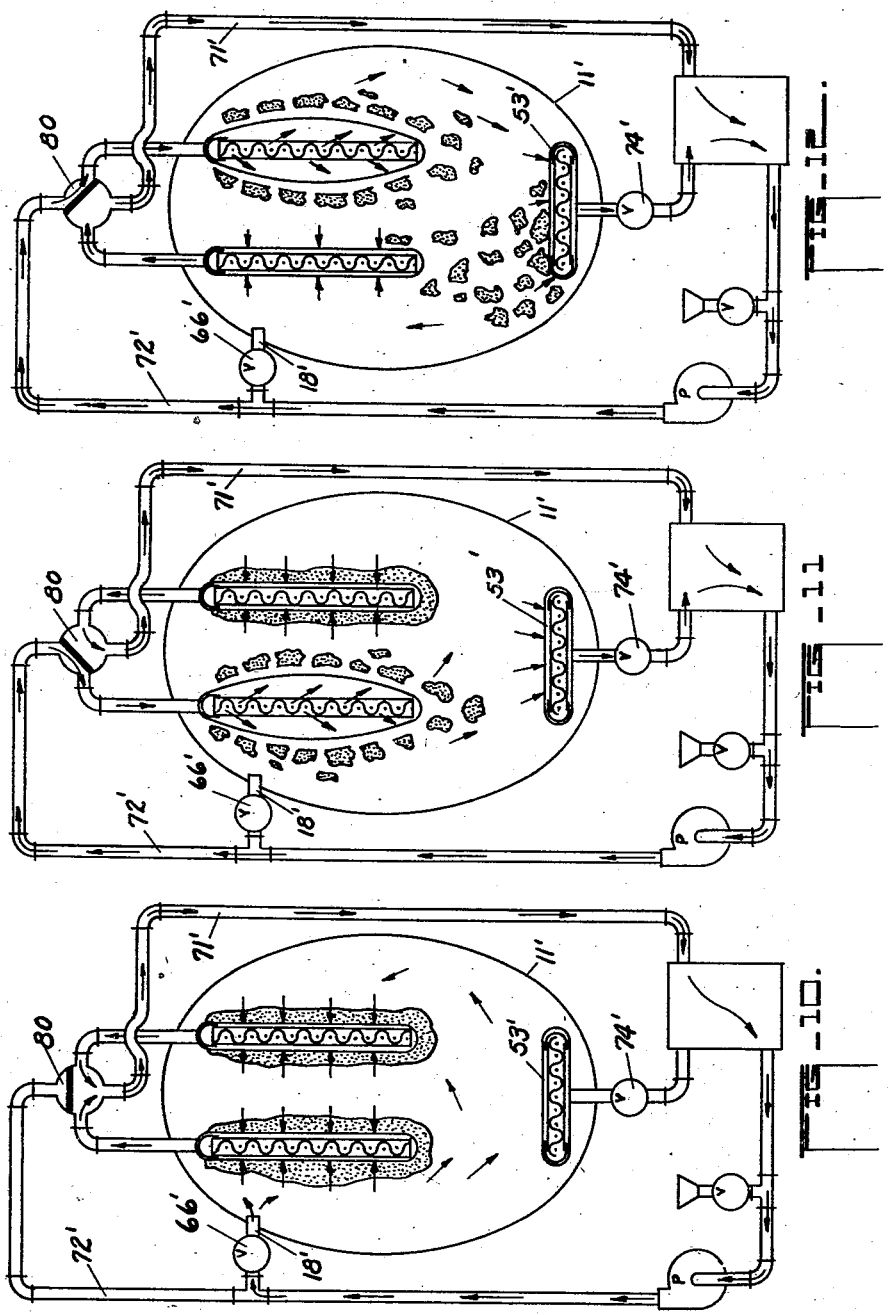

Nov. 12, 1940.  L. E. SODERQUIST  2,221,210
FILTER FOR DRY CLEANER SOLVENTS
Filed Oct. 1, 1937  6 Sheets-Sheet 6
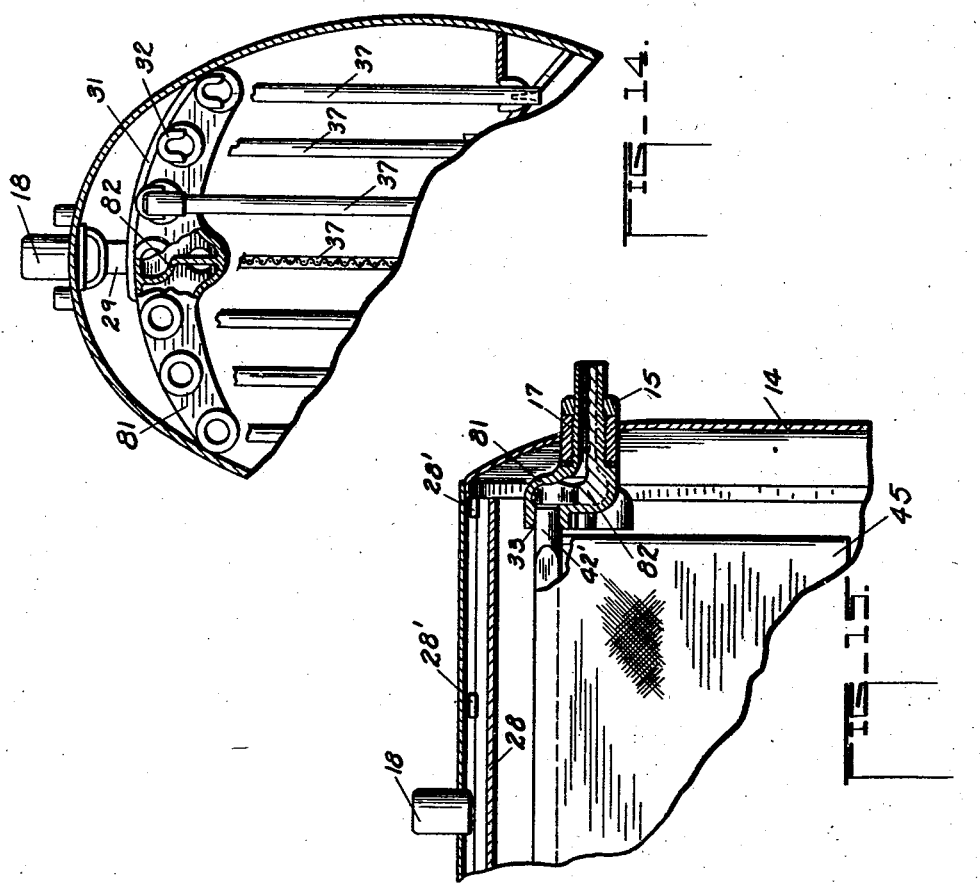
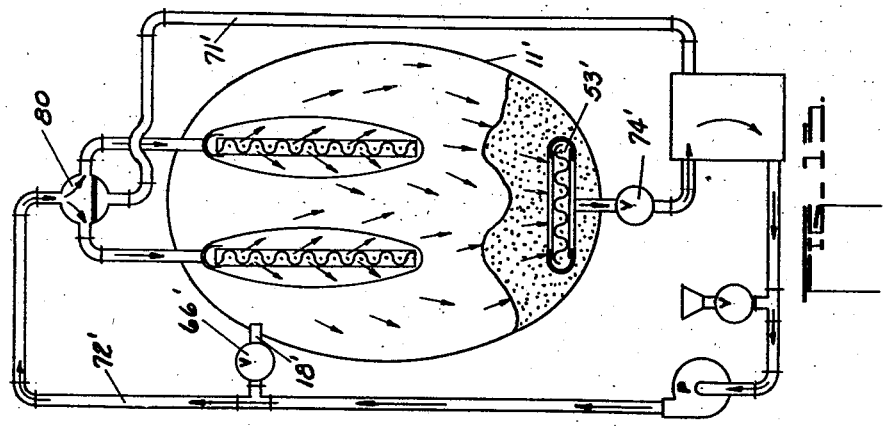
INVENTOR.
Leslie E. Soderquist
BY
ATTORNEYS Patented Nov. 12, 1940

2,221,210

UNITED STATES PATENT OFFICE 2,221,210

FILTER FOR DRY CLEANER SOLVENTS

Leslie E. Soderquist, Akron, Ohio, assignor to National Rubber Machinery Company, Akron, Ohio, a corporation of Ohio Application October 1, 1937, Serial No. 166,761

1 Claim. (Cl. 210—182)

This invention pertains to filters and, more particularly, to filter systems and filter construction peculiarly adapted for use in commercial dry cleaning machines although susceptible of much broader application. However, the invention will be disclosed in connection with dry cleaning machines and dry cleaning processes.

In dry cleaning processes it is necessary, for best results, to maintain the cleaning agent or solvent clean and free from contamination and, preferably, to remove any contamination or dirt from the solvent practically as fast as the solvent becomes contaminated in the cleaning process. In order to accomplish this end the solvent may be filtered continuously or intermittently, as may be preferred or desirable, depending upon the rate of contamination, the volume of solvent used, and other factors, as will be appreciated. Many kinds of filters have been designed for these purposes but all seem to offer difficulties of one character or another, either as to results or as to construction and operation.

Accordingly, one of the primary objects of the invention is to provide a filter so constructed that it may be handled by relatively unskilled operators, for the cleaning operations, for the regeneration or rehabilitation of the filter mediums and for the removal and replacement of certain removable and replaceable filter elements.

Another object of the invention is to provide a filter system which may be operated intermittently to filter and clean the solvent or relatively continuously for such purposes, the system being also so arranged that upon occasion the filter medium may be regenerated or rehabilitated with a minimum of effort and in a minimum of time.

Another important object is to provide a method or system of operation of a filter utilizing a filter clap such as diatomaceous earth, fuller's earth and the like.

Still another object is to provide a filter element having a high degree of efficiency and one which is relatively simple and inexpensive to manufacture and use. In this connection it may be mentioned that the filter elements provided by the invention are of unique character and ideally adapted for filter purposes either with or without the use of a fuller's earth or other material pre- coat and without the addition of a filter aid material such as diatomaceous earth.

A still further object is to provide a filter so constructed and arranged that the filter elements, the spent filter aid, i. e. the diatomaceous earth, fuller's earth or the like, and the interior of the filter chamber generally, are easily accessible for cleaning, replacement of elements and other parts and for inspection.

Many other objects including a novel arrangement whereby the filter elements may be removably disposed within the filter, an arrangement whereby the filter elements are disposed to give a maximum of use or filter life for a minimum filter chamber capacity, and an arrangement whereby the spent or used filter aid medium may be utilized to a maximum extent, will be appreciated and understood after reading the following description and claim and after viewing the drawings in which:

Fig. 1 is a rear elevation view of a dry cleaning cabinet or machine with parts broken away to show the filter, constructed in accordance with a preferred form of the invention, located therein.

Fig. 2 is a transverse cross sectional view of the filter shown in Fig. 1, with some of the parts broken away and other parts in section, the better to show the construction and arrangement.

Fig. 3 is a longitudinal cross section through the filter.

Fig. 4 is a large scale cross section of one of the filter elements taken on the line IV—IV of Fig. 3.

Fig. 5 is a large scale longitudinal view of a fragment of one of the filter elements as it would appear looking from the line V—V of Fig. 2.

Fig. 6 is a large scale cross section of one of the filter elements taken along the line VI—VI of Fig. 5.

Fig. 7 is a large scale cross section of a portion of a discharge or drain filter element taken along section line VII—VII of Fig. 3.

Fig. 8 is a diagrammatic illustration of the filter system in normal operation.

Fig. 9 is a diagrammatic illustration of the filter system in reverse or flushing operation when the filter clay or other filter aid is being removed from the filter elements.

Figs. 10 to 13 inclusive are diagrammatic views of a modified system of filtration and back-flushing, and Figs. 14 and 15 are fragmentary sectional views corresponding somewhat to the views of Figs. 2 and 3, respectively, showing an arrangement whereby the filter elements may be segregated into two groups, four elements in one group and three in the other group (because of the odd number of elements shown) through a partition in the header into which the elements normally discharge.

The dry cleaning machine 10 carries a filter, the shell of which is designated 11, and an outlet pipe designated 12. A still 13 is used in conjunction with the filter but since this still has no particular pertinence to or bearing on the present invention it will not be further described.

The shell 11 is of elliptical shape in vertical cross section and at its rear end is closed by a head 14 which may be welded or otherwise secured to the shell and which is provided with an opening through which an outlet pipe 15, connected with a header 16, passes. The outlet pipe 15 may be welded to the shell head 14 as indicated at 17. The outlet pipe 12 also passes through the wall of the shell and is welded thereto and an inlet pipe 18 similarly passes through the shell at the top and is welded thereto to provide a tight joint. The front end of the shell is provided with reinforcing rim member 19 which extends completely about the shell and may be welded or otherwise secured thereto to effect a leak-proof connection therewith. The rim member 19 is provided with a plurality of pairs of lugs 21 which register with corresponding lugs 22 formed on a rim 23 welded or otherwise secured to the perimeter of a front cover plate 24. A gasket 25 is disposed between the rims 19 and 23 and draw bolts 26, disposed between the registering pairs of lugs 21 and 22, together with threaded hand screws 27 engaged with the bolts 26, serve to draw the shell and cover plate 24 tightly together.

Extending forwardly and rearwardly of the shell 11 at the top thereof and terminating short of the ends thereof is a channel shaped member 28 which at its marginal upper edges may be welded or otherwise secured to transverse bars 28' in turn welded at their ends to the shell. The bars 28' not only support the channel 28 and other parts to be described but also serve to space the upper edges of the channel from the shell so that the inflowing cleaning fluid may be distributed in a relatively uniform manner to the filter elements. The ends of channel 28 may be left open as shown. Secured to the bottom of the channel member 28 at the front of the filter chamber is supporting bracket member 29 which carries an arcuate strap support 31 to which a plurality of U-shaped filter guides 32 are secured in spaced relation to one another. The header 16 is provided with a plurality of orifices, the mouths of which are flared outwardly as at 33 for the reception of outlet pipes of filter elements and the number of guides 32 and their locations are arranged to correspond with the number and locations of the orifices or pipe openings in the header. In spaced relation to and well above the bottom of the filter shell and extending arcuately thereover is a supporting member 34 which carries a plurality of filter element guides 35 which correspond in number and position to the number and position of the guides 32. Each end guide may be additionally braced by a bracket member 36 welded or otherwise suitably secured to the interior of the shell.

The guides 32 and 35, together with the header 16, support a plurality of filter elements 37 all of which are substantially identical in construction and relatively interchangeable with one another and with other similar elements. The construction of these elements is best shown in Figs. 4 to 6, inclusive, from which it will be noted that each element has a core composed of a central relatively coarse wire screen 38, substantially of rectangular shape, and a pair of relatively fine wire screen sheets 39 one disposed on each side of the coarse wire sheet or screen 38. Three sides, that is, the front edge, the bottom edge and the rear edge, of the filter element core, are embraced by a U-shaped frame 41 which is tightly clamped against the core. The top margin of the core is also enclosed by a U-shaped framing member 42 which has flanged portions 43 which overlap and are tightly clamped or otherwise secured against the sides of the screens 39 of the core but the outer wall of framing member 42 is spaced from the marginal edges of the screens 38 and 39 to provide a channel 44 therebetween and extending entirely along the upper edge of the core. The channel or U-shaped framing member 42, of course, is suitably secured to the tops of the end framing members 41 so that the only ingress or egress for fluid is through the sides of the screens 39 and the edges of the screens at the top or through the channel 44.

Each element core thus constructed is completely inclosed within a filter cover 45 which may be composed of flannel, twill screen or other filter material and each cover is made large enough loosely to receive the filter element core for a purpose which will appear hereinafter. The open mouths of the covers are arranged to open at the front vertical edges of the filter units and are provided with rolled seams 46 which are stitched down but not stitched together. The open end of each cover may be closed and clamped in that position by a longitudinally slit piece of light metal tubing 47 having a sufficient resilience to permit its edges along the slit to be spread apart and slid over the end of the cover with the seams 46 within the tubing and thereafter to clamp tightly upon the sides of the cover. Spring clips or other fastening means 48 may be used at the upper front corners of the filter elements tightly to clamp the split pipes 47 to the upper front corners of the elements. At the rear each channel member 42 is formed to provide a cylindrical end or pipe 42' adapted to have a relatively tight but sliding fit in one of the orifices in the header 16.

It will be apparent from the foregoing that the filter elements may be very cheaply and simply constructed, assembled and taken apart and that when the cover 24 is removed each filter element may be removed and replaced with a minimum of labor and difficulty. The guides 32 and 35 serve to guide and direct the insertion and removal of each filter element as well as to support the elements in their proper relationship within the filter chamber.

The outlet 12 is also provided with a filter element which may be constructed after a manner similar to the construction of the previously described elements. The core is composed of a sheet of relatively coarse wire screening 49 on each side of which is a relatively fine wire screen 51. Framing 52 in this case completely surrounds the entire core at its marginal edges and a filter cover 53 similar to the cover 45 completely encloses the core with the seam edges 54 of its mouth within a split pipe 55 after the manner in which the seam edges 46 are secured within the split pipe 47. In this case, however, the outlet from the filter element is at one side instead of at an edge margin and for this purpose the core is punched to provide an opening 56 which at one side is closed by a cap member 57 which is secured to and through the core by rivets or the like 58 which at the other side of the core serve to secure a spud 59 to the core with the core opening 56 in register therewith. A gasket or the like 61 seals the spud to the outlet pipe 12 and the marginal edges of the bag 53 may be tightly clamped between the gasket 61 and the flanged end of the spud.

The system in its normal operation is illustrated in Fig. 8. A cleaning chamber or storage chamber or both, generally designated 62, is connected through piping 63 of the pump 64 which in turn is connected through piping 65, valve 66 and pipe 18 with the filter chamber. The header 16 diagrammatically represented in this figure is connected through pipes 67 and 68, valve 69 and piping 71 with the chamber 62. A by-pass 72 connects with the lines 67 and 68 through a valve 73 and the bottom filter outlet pipe 12 is connected through a valve 74 and a pipe 75 with the chamber 62.

Normally, the dirty and used cleaning fluid which may be contained in the chamber 62 or in some other compartment is withdrawn therefrom through pipe 63 by pump 64 and forced through pipe 65, valve 66 and pipe 18 into the filter chamber and after passing through the top filter elements flows into the header 16 and thence through the pipes 67 and 68, valve 69 and pipe 71 back to the chamber 62 or to a compartment for clean fluid from which it may be supplied to a cleaning chamber. Under these conditions the valves 73 and 74 are closed. Diatomaceous earth, fuller's earth or other filter aid or filter material, preferably is introduced into the contaminated or dirty cleaning fluid at a suitable point by any suitable feeding device diagrammatically represented by the funnel 60 and pipe 70 leading into suction line 63. The diatomaceous earth or other material is introduced in a finely pulverulent form and is carried into the filter chamber where some small portion thereof may drop to the bottom but the great bulk of which is carried against the sides of the covers 45 of the upper filter elements as generally indicated by the arrows in Fig. 8 thus gradually building up a depth of filter material on the filters, as shown. The fluid is filtered through the filter aid or material and covers 45 into the cores of the filter elements and thence passes through the channels 44 into the header and back to the cleaning chamber or to storage, as may be required. Initially, that is, before starting up the machine, the filter covers may be given a pre-coating of filter material.

While the arrangement and construction of the filter elements are such that a considerable volume of fluid may be filtered before it becomes necessary to renew or replace the filter bags, the diatomaceous earth or other filter material introduced into the fluid may in time build up on the sides of the filter elements, that is, against the covers 45, to such an extent as seriously to interfere with the filter rate or the flow. In this case it is necessary to reduce the resistance to flow by removing some or all of the filter aid, dirt and so forth which has built up on the side of the filter element covers.

In order to accomplish this purpose the flow of fluid through the filter elements is temporarily reversed by closing the valves 66 and 69 and opening the valves 73 and 74 so that the fluid withdrawn from the chamber 62 (clean fluid only should be used for back-flushing) by the pump 64 by-passes the normal inlet 18 and flows around through pipe 72 and valve 73 and through the header 16 to the interior of the cores of the filter elements, thence through the filter covers of the upper filter elements, thence into the bottom filter element and out of the pipe 12 through the valve 74 and pipe 75 to the cleaning chamber 62. Inasmuch as the filter covers 45 relatively loosely cover the sides of the cores of the upper filter elements, that is, are not attached thereto, the internal pressure, due to the reversed flow of the fluid, distends these covers after the manner indicated in Fig. 9 and as the covers distend or flex the diatomaceous earth or fuller's earth or other material caked thereon will tend to crack and break away and will fall into the bottom of the filter chamber as shown. After an excess quantity of spent filter aid, etc., has accumulated in the bottom of the filter chamber or after the filter aid has become so spent or clogged with dirt as to be relatively unusable, the filter chamber may be drained of fluid in any suitable way, the head or cover 24 removed and the chamber cleaned as will be understood.

The filter covers 45 and 53, which have been described above as being made of flannel or other cloth fabric suitable for filter purposes, may also be made of finely perforated or woven sheets of metal. If made of metal they should be of sufficient flexibility and resilience to permit the necessary flexure or distention on back washing without breaking or cracking, as will be appreciated. During the back washing or reverse cycling of the cleaning fluid, it is preferable to avoid the introduction of any clay or other filter aid or material into the interior of the filter elements and to such end no material is added to the fluid during the reversing operation while care should be exercised to insure that the lines 63, and 65 and pump 64 are free of all clay or other filter material before the reversing operation is started.

In the filter system illustrated in Figs. 10 to 13, inclusive, the construction and arrangement of the filter elements and of the other several parts in most part may be the same as or similar to the construction above described so such parts will not be described again; only the differences in construction, arrangement and operation will be mentioned.

Under some conditions of operation, as when the filter aid, dirt, etc., have built up to a considerable depth on the lower element 53 in the bottom of chamber 11, the volume of flow of solvent, per unit of time, which may be run in reverse to normal flow through the filter elements, may be insufficient completely and thoroughly to break or knock the cake off the elements. It has been discovered, however, that very satisfactory cleaning of the elements may be secured on a flushing operation if the valves be manipulated to reverse the flow through the filter elements, then to cause normal flow, then reverse flow and so forth, several times. The resultant back and forth flow of fluid and the resultant breathing movements of the filter covers will rapidly break the cake on the elements causing the cake to drop to the bottom of the filter chamber. Such procedure may be carried out with the system of Figs. 8 and 9, through the manipulation of valves 66, 73, 69 and 74 heretofore described, but it may be preferable to substitute one valve of a multi-way type for two or more of the several independent valves and otherwise to modify the system as will appear hereinafter, so that the fluid flow may be concentrated upon one element or a group of elements less than the whole number of elements.

Referring to Figs. 10 to 13, inclusive, it will be noted that a valve 80 of a four-way type really takes the place of valves 69 and 73 previously described and also of valve 66, although a valve 66' has been illustrated in pipe 18' for use if desired. Fig. 10 shows the system in normal filtering operation with the valve 80 turned to close off line 72' but connecting separate filter or separate sets of filter elements with the outlet line 71'. The valve 80 is shown in Fig. 11 turned to cause the fluid to flow into one element or set of elements and out through the other element or set of elements while Fig. 12 shows this procedure reversed as between elements or groups of elements. In Fig. 13 the valve 80 has been turned to cause the fluid to back flush simultaneously through all filter elements. In operation, should simultaneous back flushing of the elements, either with the system of Figs. 8 and 9, or with the system of Figs. 10 to 13, inclusive, fail to dislodge the cake of filter material, dirt, etc., accumulated upon the filter covers, the operator may manipulate valves 66, 69, 73 and 74 alternately to send the fluid first in one direction and then in the other direction through all filter elements or groups or sets of elements or, if using a system equipped with a valve, such as valve 80, manipulation of the valve back and forth between the positions shown in Figs. 11 and 12, for a few times will effect the results desired.

In the embodiment of Figs. 10 to 13, inclusive, of course, each filter element or group of elements will have its own header or manifold leading to the valve 80, as will be understood, or, as shown in Fig. 14, a single header or manifold 81 having a partition 82 may be provided. Here each element of one group of four elements is connected to the header at one side of partition 82, while each element of the other group of three elements is connected with the header at the other side of the partition. Under these circumstances a valve such as valve 80 will have independent connections with the several sides of the manifold or header after the manner illustrated in Figs. 10 to 13 inclusive. Other arrangements may be provided for the accomplishment of the same purpose.

While I have illustrated and described what is at present a preferred embodiment of the invention, it will be understood and appreciated that many changes and modifications may be made therein without departing from the spirit of the invention and the scope of the appended claim.

I claim:

A filter for liquids containing foreign materials including fibres, said filter comprising a vessel containing a pulverent, non-fibrous, filtering material, means for introducing liquid to be filtered into the vessel, one or more hollow filtering elements having flexible walls in the vesesl, means for withdrawing said liquid from the vessel through said element or elements and returning it to the vessel, said element or elements being such as to filter the said filtering material out of the liquid in the vessel onto the surfaces of the element or elements along with the impurities in the liquid, a filtering member in said vessel, and means for reversing the flow of said liquid through said filter element or elements to withdraw the liquid from the vessel through said filtering member and to return the liquid to the vessel through said filtering element or elements, said reverse flow of the liquid thereby flexing the walls of said element or elements to dislodge said pulverent filtering material bonded therein by the filtering action so as not to become so intertwined with the filtering element or elements as to permanently clog the same.

LESLIE E. SODERQUIST.